US008564662B2

(12) United States Patent
Busch et al.

(10) Patent No.: US 8,564,662 B2
(45) Date of Patent: Oct. 22, 2013

(54) VEHICLE VISION SYSTEM

(75) Inventors: David B. Busch, Holland, MI (US); Eric S. Deuel, Allendale, MI (US); Richard J. Chutorash, Oakland Township, MI (US); Peter C. Laux, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 1081 days.

(21) Appl. No.: 12/306,498

(22) PCT Filed: Jun. 27, 2007

(86) PCT No.: PCT/US2007/072258
§ 371 (c)(1),
(2), (4) Date: Mar. 20, 2009

(87) PCT Pub. No.: WO2008/002989
PCT Pub. Date: Jan. 3, 2008

(65) Prior Publication Data
US 2009/0284598 A1 Nov. 19, 2009

Related U.S. Application Data

(60) Provisional application No. 60/816,994, filed on Jun. 28, 2006.

(51) Int. Cl.
*H04N 7/18* (2006.01)
(52) U.S. Cl.
USPC .......................................................... 348/148
(58) Field of Classification Search
None
See application file for complete search history.

(56) References Cited

U.S. PATENT DOCUMENTS

| 3,893,755 | A | * | 7/1975 | Cobarg et al. | 359/847 |
| 4,714,322 | A | * | 12/1987 | Cook | 359/606 |
| 5,469,298 | A | * | 11/1995 | Suman et al. | 359/630 |
| 6,498,620 | B2 | * | 12/2002 | Schofield et al. | 348/148 |
| 2005/0128294 | A1 | * | 6/2005 | Green et al. | 348/148 |
| 2005/0134479 | A1 | * | 6/2005 | Isaji et al. | 340/901 |
| 2005/0154505 | A1 | * | 7/2005 | Nakamura et al. | 701/1 |
| 2005/0168695 | A1 | * | 8/2005 | Ooba et al. | 353/13 |
| 2006/0125919 | A1 | * | 6/2006 | Camilleri et al. | 348/148 |
| 2006/0164220 | A1 | * | 7/2006 | Harter et al. | 340/435 |
| 2006/0227212 | A1 | * | 10/2006 | Schedivy | 348/148 |

FOREIGN PATENT DOCUMENTS

| DE | 199 41 560 A1 | 3/2001 |
| GB | 2 351 055 | 12/2000 |
| GB | 2 351 055 A | 12/2000 |
| JP | 2005-055615 | 3/2005 |

(Continued)

OTHER PUBLICATIONS

International Search Report and Written Opinion for International Application No. PCT/US2007/072258; mailing date Apr. 23, 2008; 12 pages.

(Continued)

*Primary Examiner* — Ario Etienne
*Assistant Examiner* — Clayton R Williams
(74) *Attorney, Agent, or Firm* — Foley & Lardner LLP

(57) ABSTRACT

The present vehicle vision system enhances visibility internally and externally with respect to the vehicle. A vision system is provided which is configured to switch between a plurality of modes. The system further includes a far-field effect which alters the focal length of the display in the vision system so as to reduce driver eye strain during operation. The vision system may be incorporated into various locations throughout the vehicle (e.g., the vehicle overhead console).

7 Claims, 12 Drawing Sheets

(56) References Cited

FOREIGN PATENT DOCUMENTS

| | | |
|---|---|---|
| JP | 2005-184225 A | 7/2005 |
| JP | 3110855 U | 7/2005 |
| KR | 20-0256607 | 12/2001 |

OTHER PUBLICATIONS

Chinese Office Action and English Translation of the same, dated Sep. 7, 2010, 8 pages.

Korean Office Action for KR 10-2009-7000147, dated Oct. 28, 2011, 3 pages.

Unofficial Translation of Korean Office Action for KR 10-2009-7000147, (Office Action dated Oct. 28, 2011), 3 pages.

Korean Office Action for KR Application No. 10-2009-7000147 and translation of the same, dated Oct. 25, 2010, 9 pages.

English Translation of Notice of Reasons for Rejection dated Jul. 24, 2012 as received in corresponding Japan Application No. 2009-518540.

* cited by examiner

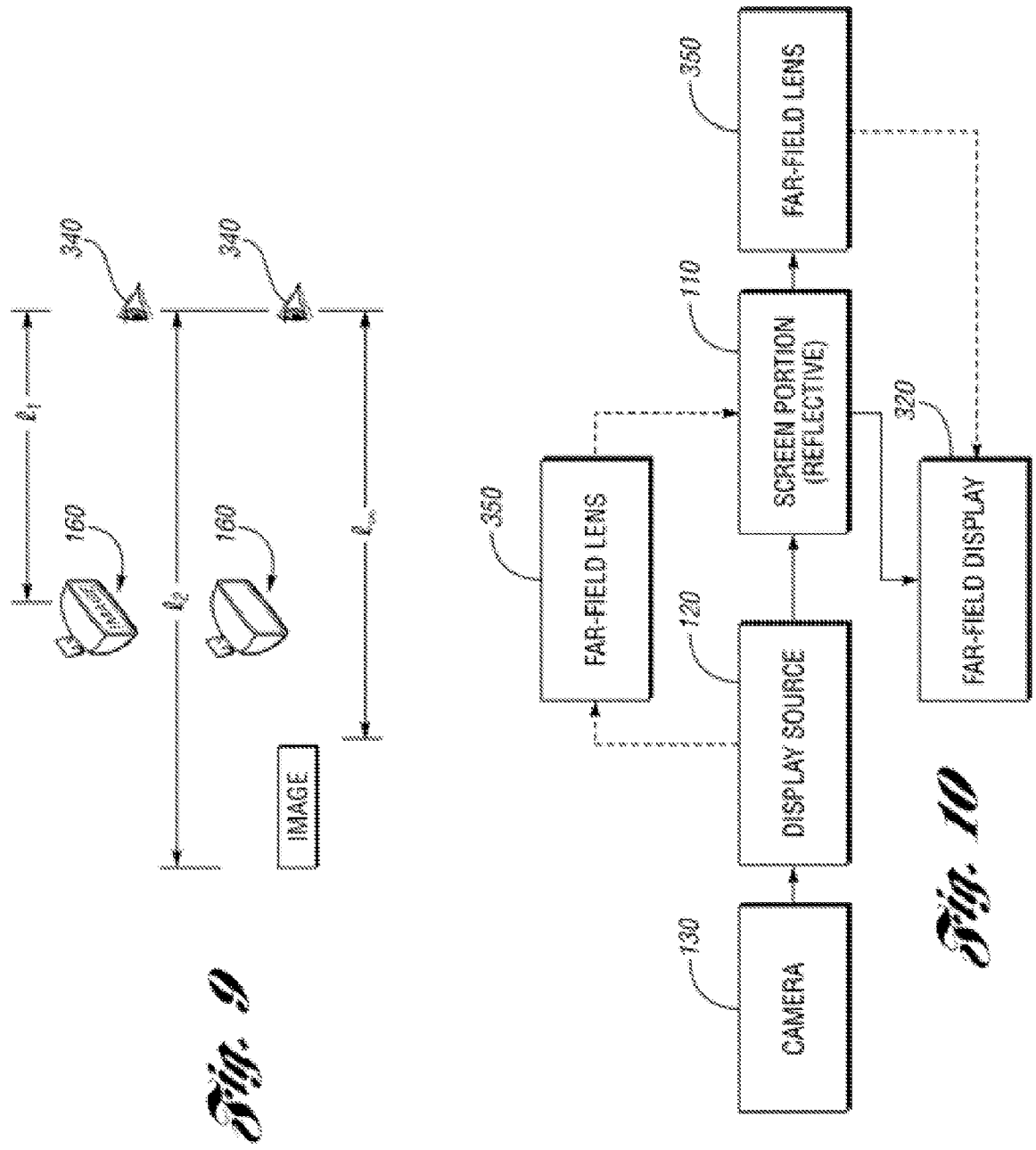

VEHICLE VISION SYSTEM

CROSS-REFERENCE TO RELATED APPLICATIONS

This application claims priority to and the benefit of U.S. Provisional Application Ser. No. 60/816,994 filed on Jun. 28, 2006, entitled "Vehicle Rear Vision System." The aforementioned provisional application is incorporated by reference herein in its entirety.

TECHNICAL FIELD

The present disclosure relates generally to rear view mirrors for use in automobiles and more specifically, to a rear viewing system configured to operate in a camera-based or reflective mode.

BACKGROUND

Rear view mirrors are utilized to enable vehicle drivers to view objects rearward the vehicle. Traditional rear view mirrors include a mirrored surface mounted to the windshield. Drivers may selectively glance at the mirrored surface and observe the reflection of objects rearward the driver and/or vehicle. This arrangement provides a limited range of visibility to the driver. For example, objects in the rearward portion of the vehicle cabin may obstruct the driver's line of sight. Such objects may include other passengers, head rests, personal items, alumni/"honor role parent" paraphernalia, and the like. Particularly, federal regulations regarding head restraints (e.g., FMVSS 202A) encourage the implementation of larger head rests within the vehicle cabin which further obstruct the driver's field of view. Additionally, reflective or mirror-based vision systems can leave a blind spot in areas not reflected to the driver by the rear view and side view mirrors.

Some contemporary rear visions systems include a two-mode operational platform enabling the driver to select between the mirror-based mode of operation (having the mirrored surface) and a camera-based mode of operation. In the camera-based mode, a camera is mounted in the rearward section of the vehicle, usually the center high-mounted stop lamp or (CHMSL). Video images are relayed from the camera to a display monitor integrated within the rear view mirror or display. Moreover, consumer surveys indicate that similar arrangements, relying on the driver to control such devices, demand a technical savvy that is not commensurate with the technical competency of the average driver. The end result is that such arrangements can be cumbersome to operate for drivers and eventually lead to customer dissatisfaction.

Additionally, both mirror-based and camera-based modes require the driver to adjust their focus to perceive the image(s) and/or information within the display. The human eye is configured to exert variable effort to perceive objects located at different locations with respect to the eye. However, when objects are approximately 2 feet or greater in distance away from the driver's eye, the required exertion of effort to perceive an object is substantially the same as if the object were 7 feet, 20 feet, 100 feet or theoretically an infinite distance away from the driver. When images are displayed within the vehicle cabin at a distance less than 2 feet from the driver's eyes, the driver must switch focus between the fore road and the rear viewing display, i.e., exerting variable levels of effort. This can place unwanted strain on the driver's eyes and lead to customer dissatisfaction.

Therefore, it is desirable to provide a vehicle vision system, at least for rear viewing, that includes a more user friendly control system for switching between various operational modes of the vision system. Moreover, it is desirable to provide a unitary display for any mirror-based and camera-based modes of operation. Additionally, it would be beneficial to provide a vehicle vision system that has the flexibility of providing video images from cameras mounted within the interior as well as the exterior of the vehicle. Further, it is desirable to provide a vision system that displays images at a distance greater that two feet away from the vehicle driver's eyes so as to minimize user eye strain. Further still, it would be advantageous to provide the driver with a display having a focal distance greater than the distance from the driver's eyes to the rearview mirror area of the vehicle. The teachings hereinbelow extend to those embodiments which fall within the scope of the appended claims, regardless of whether they accomplish one or more of the above-mentioned needs.

SUMMARY

In one exemplary embodiment, a vision system for a vehicle includes a camera mounted on the vehicle and a display source configured to receive video signals from the camera. The display source is mounted on the vehicle. A display assembly includes a screen configured to reflect images when the vision system is operating in a first mode and to display video images from the display source when the vision system is operating in a second mode.

In another exemplary embodiment, an overhead console for use in a motor vehicle at least partially housing a vision system having a camera mounted on the vehicle includes a display source configured to receive video signals from the camera. The display source is coupled to the overhead console. A display assembly includes a screen configured to reflect images when the vision system is operating in a first mode and to display video images from the display source when the vision system is operating in a second mode.

In another exemplary embodiment, the vision system for a vehicle includes a camera mounted on the vehicle and a display source connected to the camera and configured to receive video signals from the camera. The display source is mounted on the vehicle. A display assembly includes a screen configured to reflect images when the vision system is operating in a first mode and to display video images from the display source when the vision system is operating in a second mode. The rear viewing system is configured to change between the first mode and second mode automatically.

In another exemplary embodiment, a vision system for a vehicle includes a camera mounted on the vehicle and a display source connected to the camera and configured to receive video signals from the camera. The display source is mounted on the vehicle. A display assembly includes a screen configured to reflect images when the vision system is operating in a first mode and to display video images from the display source when the vision system is operating in a second mode. The rear viewing system is deformable, configured to have a flat surface or a concave surface and the concave surface may be curved with respect to a lateral, horizontal and/or vertical axis.

In another exemplary embodiment, an in-vehicle display for use in a motor vehicle for displaying images from a camera mounted on the vehicle includes a control circuit configured to receive video signals from the camera; a display coupled to the vehicle in the rearview mirror location and comprising a screen portion configured to display video images from the video signals; and a lens configured to alter a focal length of the image displayed on the display assembly.

In another exemplary embodiment, a method of displaying an image to an operator of a motor vehicle at an adjusted focal length includes providing a display surface configured to display an image. The image defines a focal length with respect to any location in the motor vehicle. The method further includes providing a lens configured to alter a perception of the focal length of the image with respect to the same location in the motor vehicle; and interposing the lens between the display surface and the operator in a manner to effectuate a distorted focal length of the image.

In another exemplary embodiment, an overhead console for use in a motor vehicle at least partially housing a vision system having a camera mounted on the vehicle includes a display source configured to receive video signals from the camera. The display source is mounted within the overhead console. A first screen portion is attached to the vehicle configured to display video images from the display source when the vision system is operating in a camera-based mode. A second screen portion includes a mirror portion for reflecting images. The display source is configured to project video images onto the first screen portion. The second screen portion is configured with respect to the first screen portion in a manner to reflect the video image at a distance, with respect to the display source, greater than the distance between the display source and the second screen portion.

In another exemplary embodiment, a bracket for a vision system includes: a first distal end that includes a flange to which a reflective surface is coupled; and a second distal end that includes a flange to which a pivot assembly and screen portion is coupled. The bracket is configured to enable the first distal end and second distal end to pivot with respect to an axis without changing the position of the of the first distal end and the second distal end with respect to another axis.

In one embodiment, a vision system with heads up display for a vehicle includes: a camera mounted on the vehicle and a display source configured to receive video signals from the camera. The display source is mounted on the vehicle. A display assembly includes a selectively transparent screen portion configured to display video images from the display source when the vision system is operating in a predetermined mode. The screen portion may be located on a side window, windshield, overhead console, center stack console, instrument cluster, rear view mirror and/or any other location on the vehicle.

BRIEF DESCRIPTION OF THE DRAWINGS

FIG. 9 is a side view of the length between a driver and an image displayed by a vision system according to an exemplary embodiment.

FIG. 10 is a block diagram of a vision system according to various exemplary embodiments.

DETAILED DESCRIPTION

Figure 1:
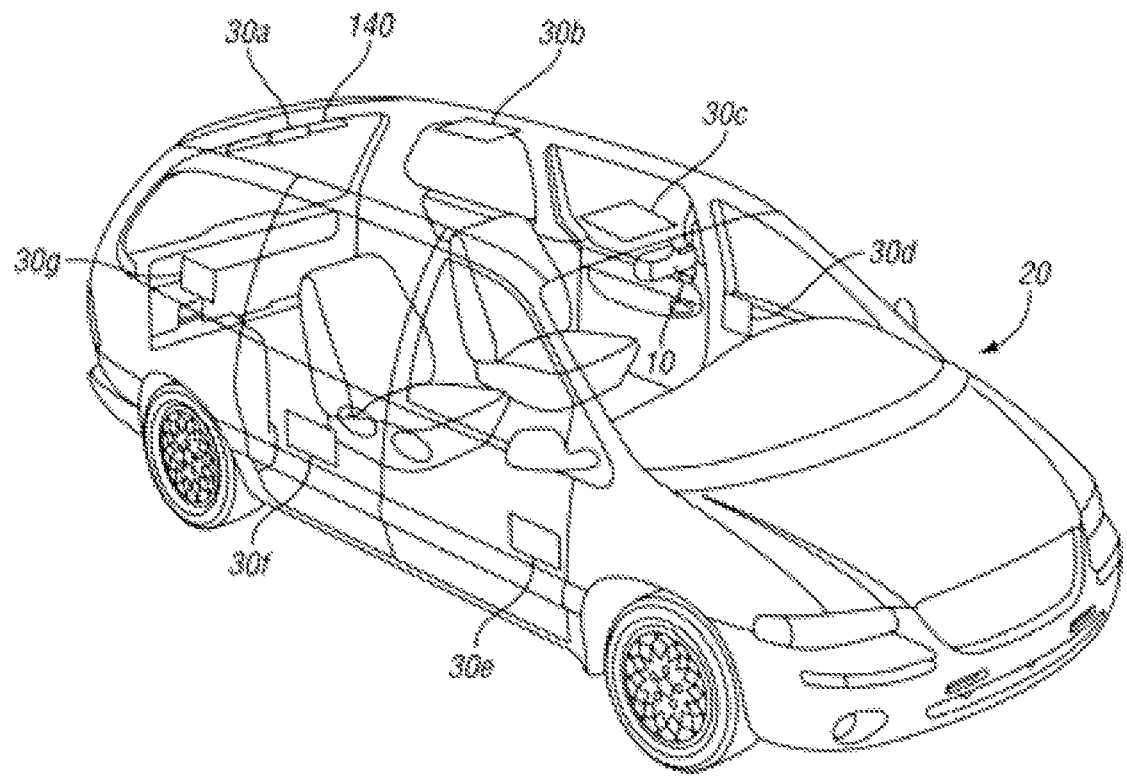
FIG. 1 is a perspective view of a vehicle with a vision system according to an exemplary embodiment.

Referring to FIGS. 1-21 a vehicle vision system 10 for viewing objects is illustrated. In a preferred embodiment, the vision system is configured for viewing objects rearward a driver of a motor vehicle or automobile. The vision system 10 is included in a vehicle 20, as illustrated in FIG. 1. The vision system 10 is configured to reflect images rearward the driver and to display video images received from cameras mounted at various locations (e.g., 30a-g) with respect to a vehicle 20.

Figure 2:
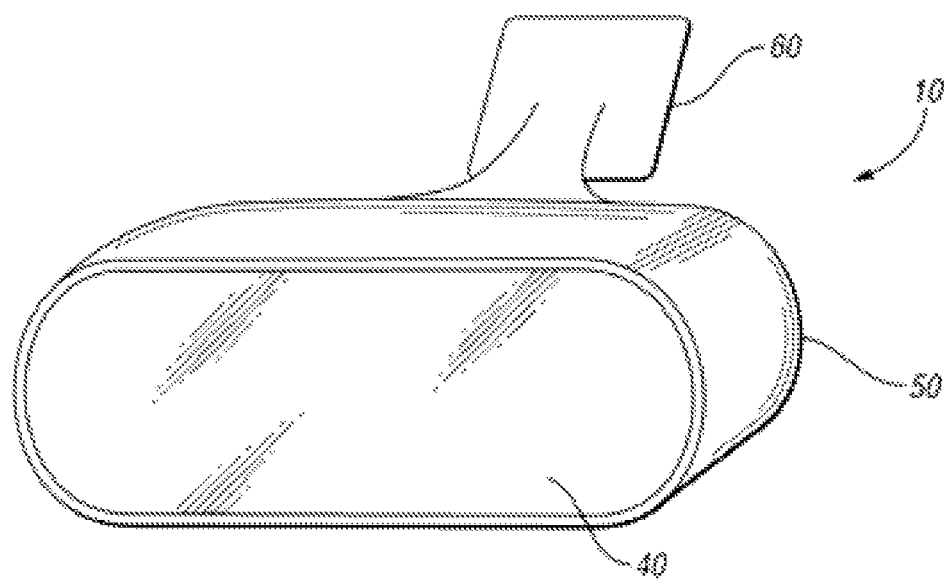
FIG. 2 is a perspective view of a vision system according to an exemplary embodiment.

In the exemplary embodiment of FIG. 2, the vision system 10 includes a surface 40 to reflect images therefrom. Surface 40 can be a mirrored surface. System 10 can be configured as a rear view mirror. A rear view mirror housing 50 is attached to the windshield of the vehicle 20 via a mounting bracket 60. A hinge (not shown) is included between the mirror housing 50 and the mounting bracket 60 to enable various drivers to adjust the mirrored surface 40 to a preferred position. Alternatively, the housing 50 can be mounted or attached to the vehicle 20 via other means or at another location (e.g., the overhead console (OHC), center-stack counsel and/or instrument panel).

Figure 3:
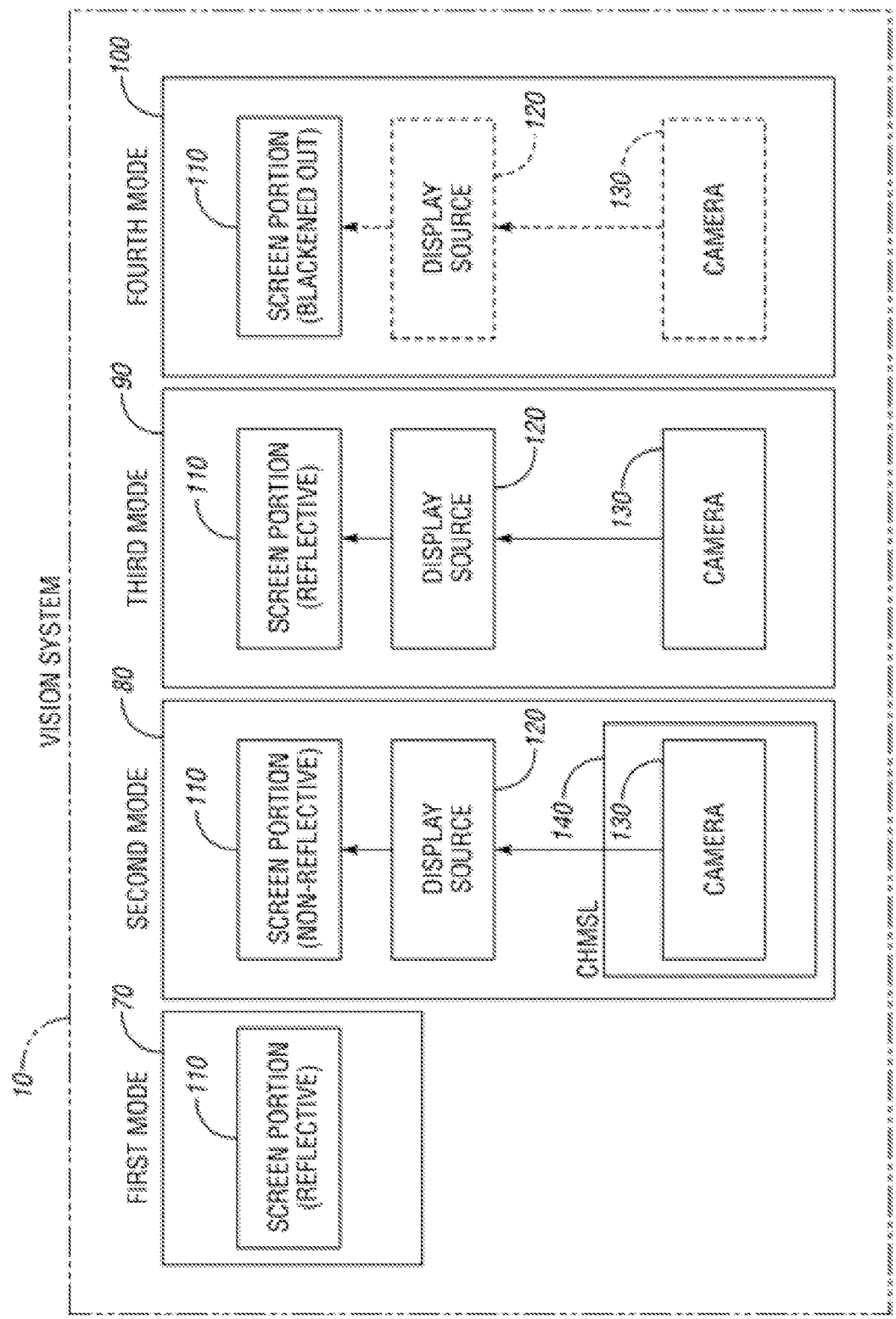
FIG. 3 is a block diagram of a vision system according to an exemplary embodiment.
Figure 4:
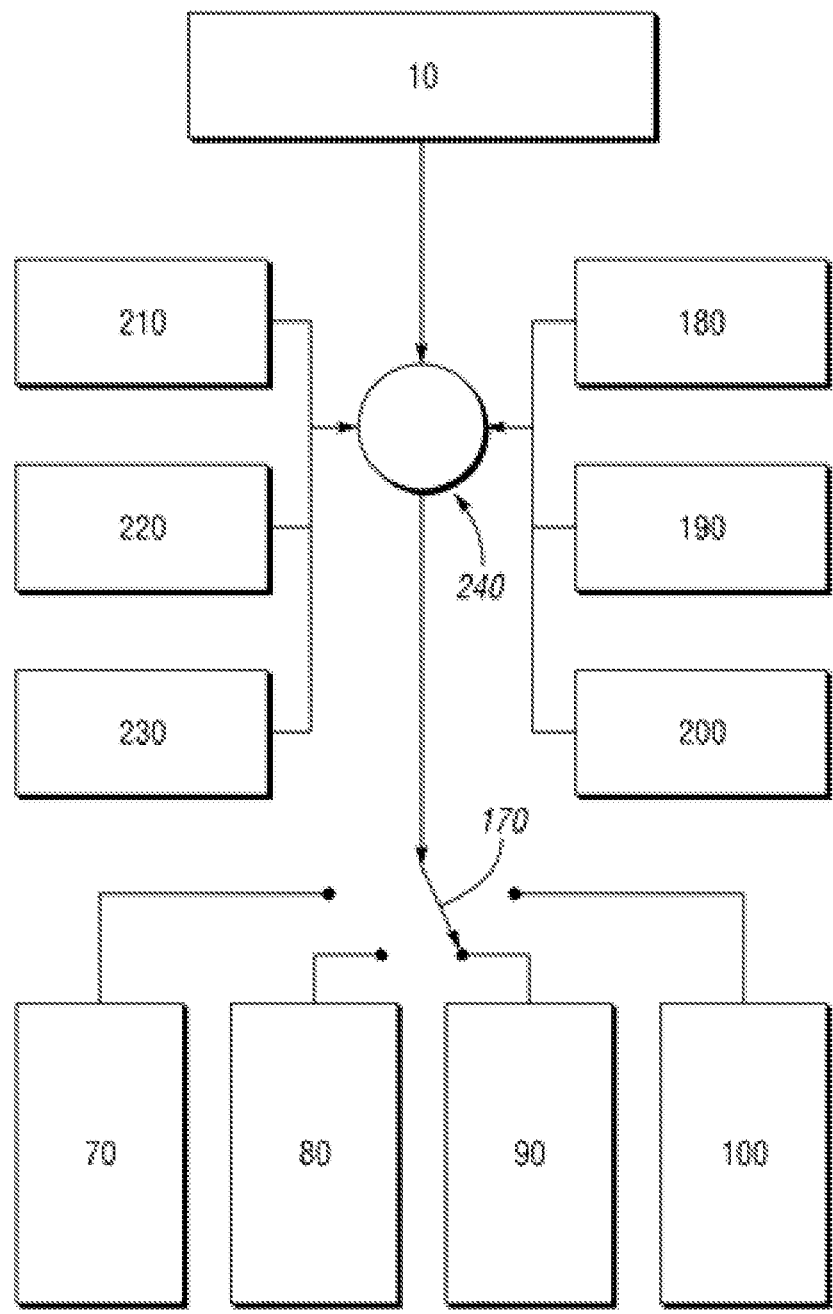
FIG. 4 is a block diagram of a control circuit for a vision system according to an exemplary embodiment.

The vision system 10, as shown in FIGS. 3-4, is configured to operate in any of at least four operational modes 70, 80, 90 and 100, all of which may be incorporated in any of the exemplary embodiments discussed herein. A first mode 70 employs a flat reflective surface or screen portion 110 to reflect items rearward the driver. A second mode 80 is a camera-based mode which includes a display source 120 that sends video display images to a screen portion 110 located within the vehicle cabin. A camera 130, located in the rearward portion of the vehicle 20 (e.g., in the center high mounted stop lamp or CHMSL 140) sends video images to the display source 120. A third mode 90 is also a camera-based mode that employs a reflective screen portion (or mirrored screen). A forth mode 100 alters the color of the screen portion 110. In fourth mode 100 the screen portion 110 appears less noticeable and is shaded to match/contrast a color within the vehicle interior color scheme to give a blackened out appearance.

The camera 130 may be positioned with respect to any one of the front, side and/or rear sections of the vehicle (e.g., 30a-g) to generate multiple views of the driver's surroundings. In the camera-based modes (e.g., 80, 90 and 100 as shown in FIG. 3), the vision system 10 includes at least one camera 130 coupled to the vehicle 20 (shown in FIG. 1). For example, in one embodiment, the camera 130 is coupled to the center high-mounted stop lamp (CMHSL 140). In another embodiment, the camera 130 is coupled to the vehicle at an interior location (e.g., 30c—a portion of the overhead counsel).

The positions of the camera 130 are not limited to those that are shown in FIG. 1. For example, in another exemplary embodiment, the camera 130 is coupled to a rearward portion of the driver's seat or a roof bow thus enabling drivers to view objects immediately behind them. Small children and other passengers can be monitored via the vision system 10, as shown and discussed with respect to the illustrated embodiments of FIG. 5.

The screen portion 110 of the vision system 10 is configured to display a plurality of images separately or simultaneously. Camera 130 is configured to send video images to a display source 120. In one embodiment, the camera 130 is wired to the display source 120. In another exemplary embodiment, the camera 130 wirelessly sends signals to the display source 120 via a radio and/or infrared frequency. The display source 120 includes a receiver (not shown) and the camera 130 includes a video transmitter (not shown). Bluetooth technology, configured to enable short-range communication between electronic devices, is utilized to enable the camera 130 to communicate with the display source 120 wirelessly. Other wireless standards or technologies can be used with the vision system 10 such as IEEE 802.11 and other communication platforms.

In at least the second and third modes (80 and 90), the display source 120 processes the video signals received from the camera 130 and transmits video images to the screen portion 110. The display source 120 is coupled to the vehicle body proximate an overhead console 150. In one embodiment, the display source 120 is a liquid crystal display (LCD) projector. The display source 120 is mounted parallel with respect to the screen portion 110 of a display assembly 160 so as to transmit video images at an angle perpendicular to the display assembly. Alternatively, a cathode ray tube (CRT) or other image projector may be utilized with the vehicle vision system 10. In another embodiment, the display source is a display monitor or flat panel display. The display monitor may be an LCD, CRT or any other display known within the art.

The display assembly 160 incorporates the screen portion 110 within the vehicle vision system 10. The screen portion 110 is configured to display video images from the display source 120. The screen portion 110 may selectively receive video imaging from the display source 120 or it may receive video imaging directly from the camera 130. In one embodiment, the display assembly 160 has a thin profile and includes an LCD (liquid crystal display) or any other thin film transistor (TFT) display configured to receive video images from camera 130 and display such images onto the screen portion 110 of the display assembly 160. In one exemplary embodiment, a switch 170—e.g., a multiplexer, switch selector or other device—(as shown in FIG. 4) is included in the vision system 10 to selectively change between receiving the video signal from the display source 130 or camera 130, in which case the display assembly 160 selectively bypasses the display source.

In one exemplary embodiment the vision system 10 is configured to automatically switch between modes 70, 80, 90 and 100, as illustrated in FIG. 4, upon the satisfaction of any one of a plurality of predetermined conditions. Each predetermined condition is detected by any one of a plurality of sensors (180, 190, 200, 210, 220 and 230, as shown in FIG. 4) coupled to an electronic circuit 240. The electronic circuit 240 includes the switch 170. The electronic circuit 240 is configured, for example, to switch the system 10 to the first mode 70 when the automatic re-deployable headrests are not deployed—an indicator that there are no passengers in the rear seating. The electronic circuit 240 is further configured to set the system 10 to the second mode 80 when any one of the automatic re-deployable headrest in the rearward section of the vehicle are deployed. The vision system 10 can be coupled to a weight sensor 190, pressure sensor 200 and/or rear door lock sensor 210 configured to detect whether a passenger is or will be present in the rear seating. The head rests may be configured to deploy upon sensing a load in the seat greater than a predetermined threshold. In another embodiment, the head rests are actuated by movement of the seatback and include a link between a latch on the pivot hinge of the seat assembly and the headrest so that the unlatching of the seat back from the design position actuates/enables movement of the head rest and any one of the operational modes.

Sensor 220 can be included in the electronic circuit 240 to determine the gear in which the transmission is operating. If the vehicle 20 is in reverse the system 10 may change modes. The electronic circuit can also communicate with the vehicle's reverse park aid system through sensor 230 so that when objects are detected behind the lower rear section of the vehicle the system 10 changes modes accordingly. The electronic circuit 240 can automatically alter the operational mode of the system 10 or the driver may manually select the mode in which the vision system operates.

In the fourth mode 100, the display assembly 160 is configured to have a minimized appearance (or a "blacked out" appearance). The display assembly may employ electro-chromatic or other reflection-inhibiting technology. Display assembly 160 includes at least one surface such that it appears darker in color in the fourth mode than in either of the first, second or third modes (70, 80 and 90, respectively).

Figure 5:
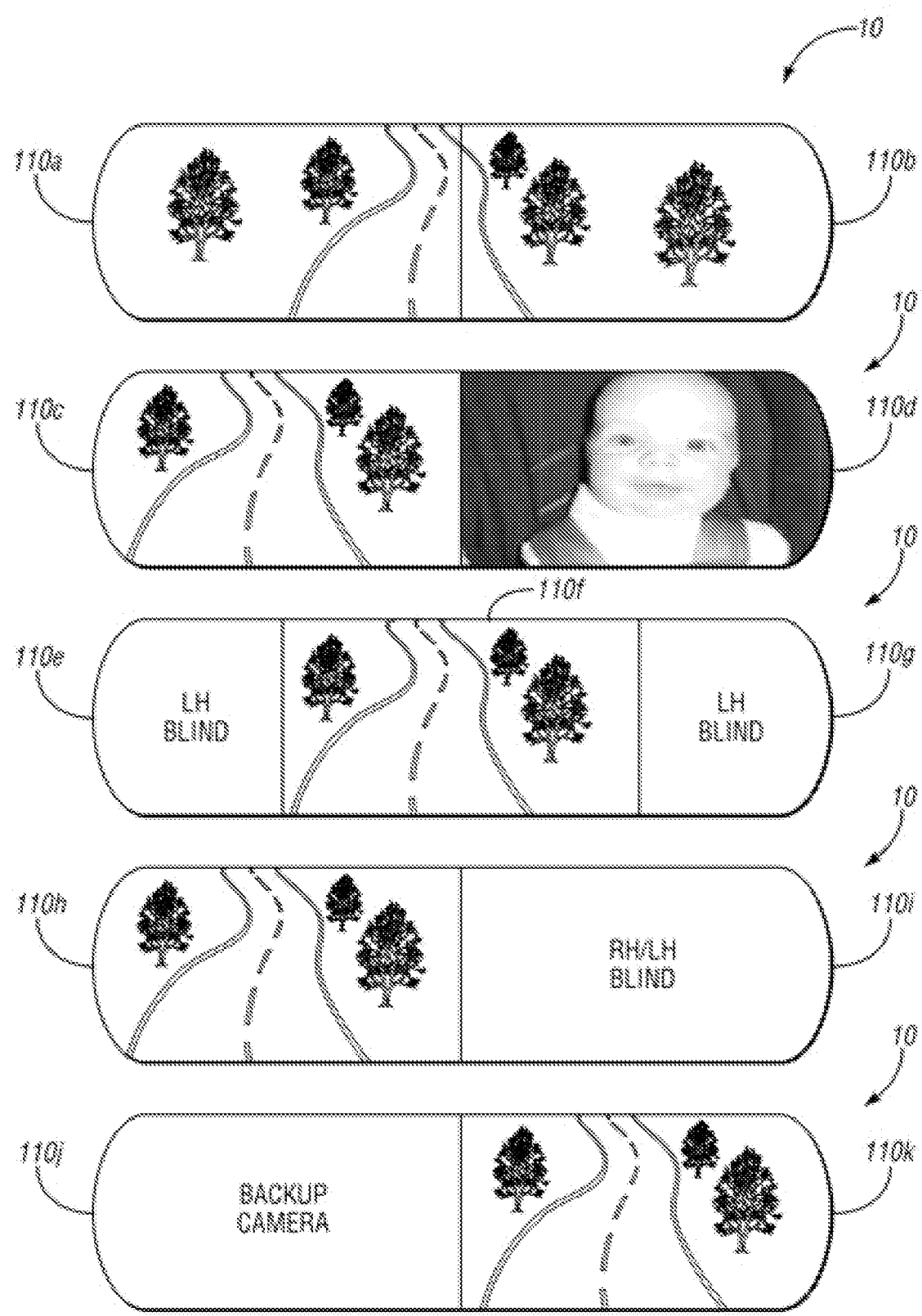
FIG. 5 is a front view of a vision system with apportioned screen portions according to several exemplary embodiments.

In one exemplary embodiment, the vehicle vision system 10 is configured with multiple screen portions (e.g., 110a-k) as shown in FIG. 5. The screen portions may reflect images (e.g., screen portions 110a, 110b, 110c, 110f, 110h and 110k) or show video images from a camera (e.g., screen portions 110d, 110e, 110g, 110i and 110j). The images may be displayed separately or simultaneously. For example, it may be desirable for the driver to monitor a small child in the rearward section of the vehicle while driving. Screen portions 110c and 110d may be displayed simultaneously to provide the driver with a reflected image on one side and an image from a video monitoring system on the other side. It may also be desirable to have images from the left and right blind sides displayed in the vision system. Screen portions 110e and 110g may be combined with a reflective surface (e.g., 110f) to enable the driver to check their blind side without looking over their shoulder. In reverse, the driver may have full vertical visibility with respect to the rearward portion of the vehicle by combining screen portion 110j (which is linked to a camera in the lower rear section of the vehicle 20) and (reflective) screen portion 110k. The reflective screen portions and camera-linked screen portions may be arranged to overlap so that the same system may show any of the screen portions 110a-110k on demand. For example, when the driver turns on their right signal light the system may automatically combine screen portions 110e, 110f and 110g. When the turn signal is turned off the system may return to a different combination (e.g., screen portions 110a-b). When the driver puts the vehicle in reverse the system may utilize screen portions 110j and 110k. A control circuit (not shown) may be provided to alter the combination of screen portions accordingly.

Figure 6:
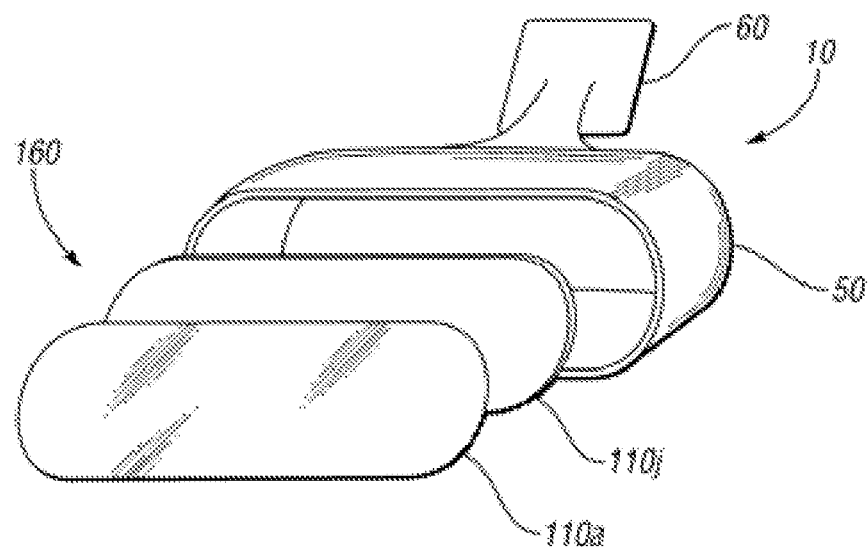
FIGS. 6-7 are exploded views of a vision system according to various exemplary embodiments.

In one exemplary embodiment, as illustrated in FIG. 6, at least one of the screen portions 110a-110k includes an electro-chromatic or electro-chemical film mounted therein. The film is selectively transparent or reflective. The film includes an electro-chromatic medium so that when a predetermined electric voltage is applied across the film the transparency of the film changes. In this manner screen portion 110a is configured to selectively switch between a reflective screen portion and a transparent surface so that a different screen portion (e.g., 110j) may be visible to the driver. The film can be composed of a nanolaminate foil.

Figure 7:
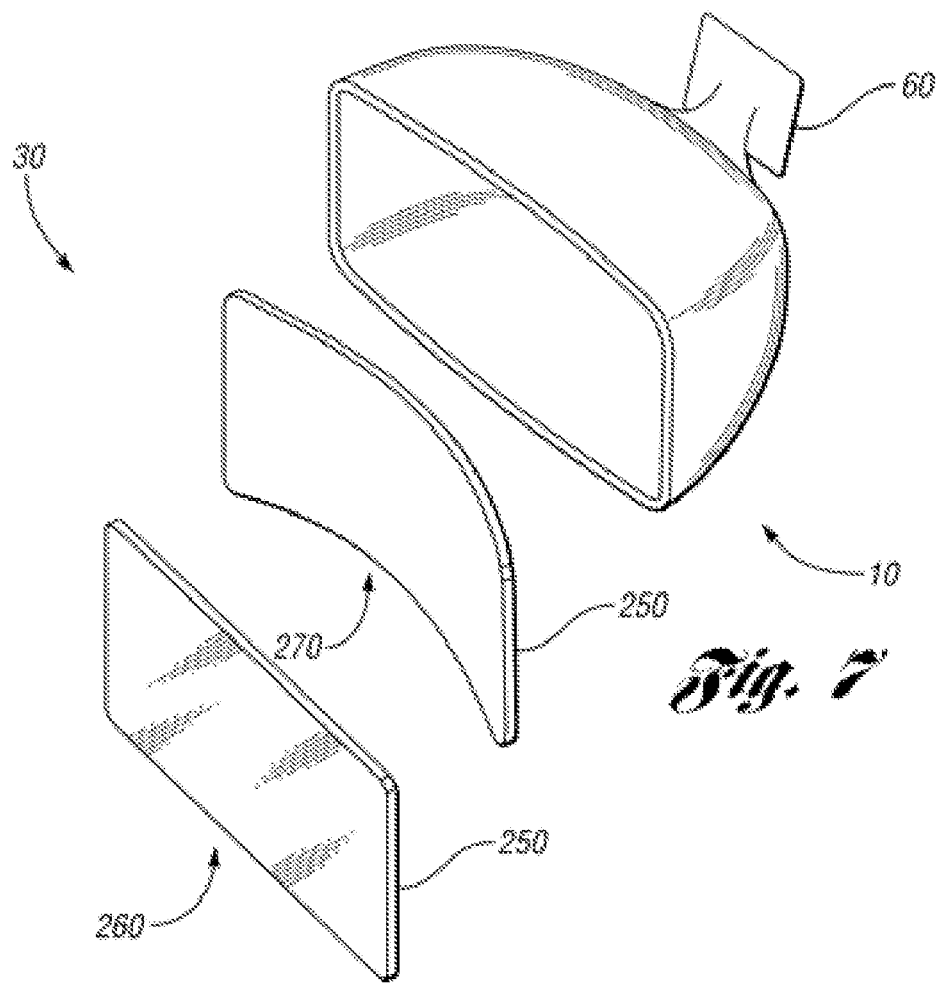

In the illustrated embodiments of FIGS. 7-10 concave/curved screen portions are utilized to alter the focal point of the images displayed by the vision system 10. As shown in FIG. 7, the display assembly 160 includes a deformable screen portion 250 which may be selectively flat or concave. In the flat position the deformable screen portion 250 is configured to reflect objects farther away from the driver than with a flat screen portion, thus yielding a far-field effect. The deformable screen portion 250 can be mounted to a servo motor and cam assembly (not shown). The motor and cam assembly can apply a linear force to the deformable screen portion 250 to substantially alter the position of the deformable screen portion 250 from a flat position (e.g. 260) to a concave position (e.g., 270). In one embodiment, the deformable surface is configured to automatically switch between the flat position 260 and concave position 270 upon meeting any one of a plurality of predetermined conditions, such as, for example, the retraction of headrests. Deformable screen portion 250 can be deformed or switched from a substantially flat configuration to a substantially concave configuration using any of a variety of mechanisms, such as a manually-adjustable mechanism or motor-driven assembly. Alternatively, deformable screen portion 250 can be permanently configured in the concave configuration in a manner suitable for displaying video images projected thereto from a display source.

Figures 8A, 8B:
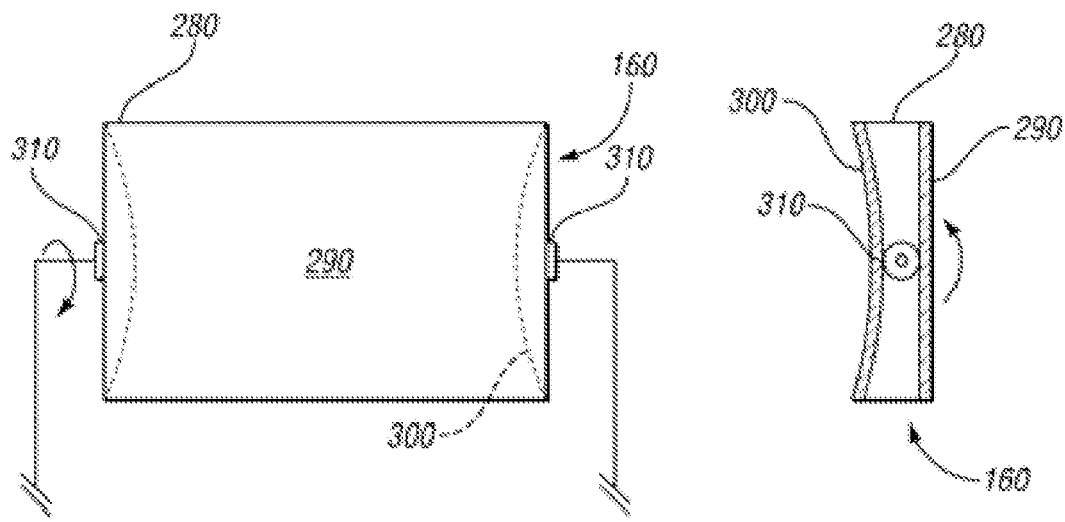
FIG. 8A is a front view of a vision system according to an exemplary embodiment.
FIG. 8B is a side view of the vision system of FIG. 8A.

As shown in FIGS. 8A-B, the display assembly 160 includes a double-sided screen portion 280 with a flat surface 290 and a curved surface 300. The flat and curved surfaces 290, 300 are on opposing sides of the display assembly 160. The display assembly 160 is configured to rotate or flip with respect to the vehicle body. The display assembly 160 may be locked into position such that the flat surface 290 is facing the vehicle operator, thereby enabling the operator to utilize the vehicle vision system 10 in a reflective mode (e.g., first mode 70). Video images may be projected onto either side of the screen portion 280 or video images may be sent directly to the display assembly from a camera. The display assembly 160 may selectively be unlocked and rotated so that the curved surface 300 faces the vehicle operator. The display assembly 160 includes a pivot hinge 310 at two ends. A latch and release mechanism (not shown) are incorporated into at least one end of the display assembly 160 to enable the display assembly to selectively lock in place.

A lens may be included in the display assembly to alter the focal length of images displayed by the vision system 10, as shown with respect to FIGS. 9-12. With respect to FIG. 9, the driver's perception when utilizing the display assembly 160 in two modes is schematically depicted. When the system 10 is operating in a reflective mode (e.g., first mode 70) images are displayed at a length, $l_1$. Images are displayed to the driver at a length where the display assembly 160 is mounted with respect to the vehicle 20. Length, $l_1$, is significantly shorter than the length at which images on the road appear ($l_\infty$ as shown in FIG. 9). A number of lenses may be utilized to make images displayed by the system 10 appear at a greater distance than where the display assembly 160 is mounted. For example, images may be displayed at a length of, $l_2$, even though the display assembly 160 is mounted at a length of $l_1$. At length, $l_2$, images appear at the same focal point as $l_\infty$. In this way, the driver does not have to refocus when looking between the vision system 10 and the road.

A far-field display 320 (or altered focal length) can be accomplished using a far-field lens 330 in a number of different configurations, two of which are schematically shown in FIG. 10. Camera 130 feeds video images to the display source 120. A far field lens 330 may be interposed between the display source 120 and the screen portion to yield a far field display 320. Alternatively, the far-field lens may be on the other side of the screen portion 110 to yield a far field display 320. Both achieve a more distant display of images with respect to the driver. It should be understood that a far field lens may be utilized with any one of the embodiments disclosed herein.

Figure 11:
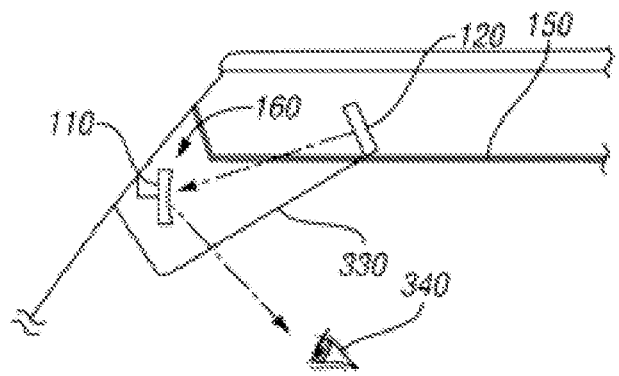
FIGS. 11-12 are side views of an overhead console with a vision system according to various exemplary embodiments.
Figure 12:
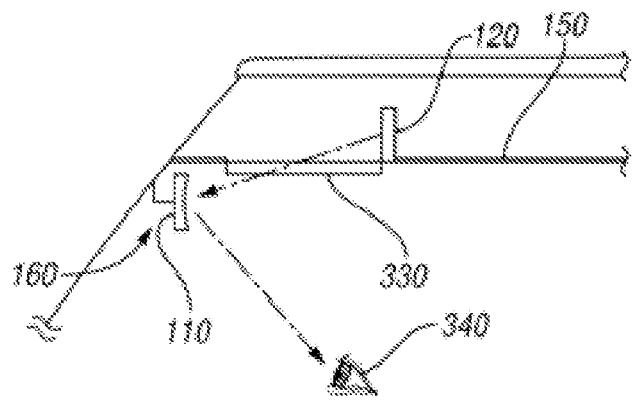

The far-field lens 330 can be incorporated into an overhead console 150, as shown in FIGS. 11-12. The lens 330 may be placed between the display assembly 160 and the driver 340, as shown in FIG. 11. The overhead console 150 incorporates the display assembly 160 as well as the display source 120. The lens 330 is interposed between the display assembly 160 and the driver 340. In the illustrated embodiment of FIG. 12, the display assembly 160 is outside of the overhead console 150. The lens 330 is placed between the display source 120 and display assembly 160 to effectuate a change in the focal length of the images portrayed therefrom. The lens 330 may be a clear non-distorting lens.

Figure 13A:
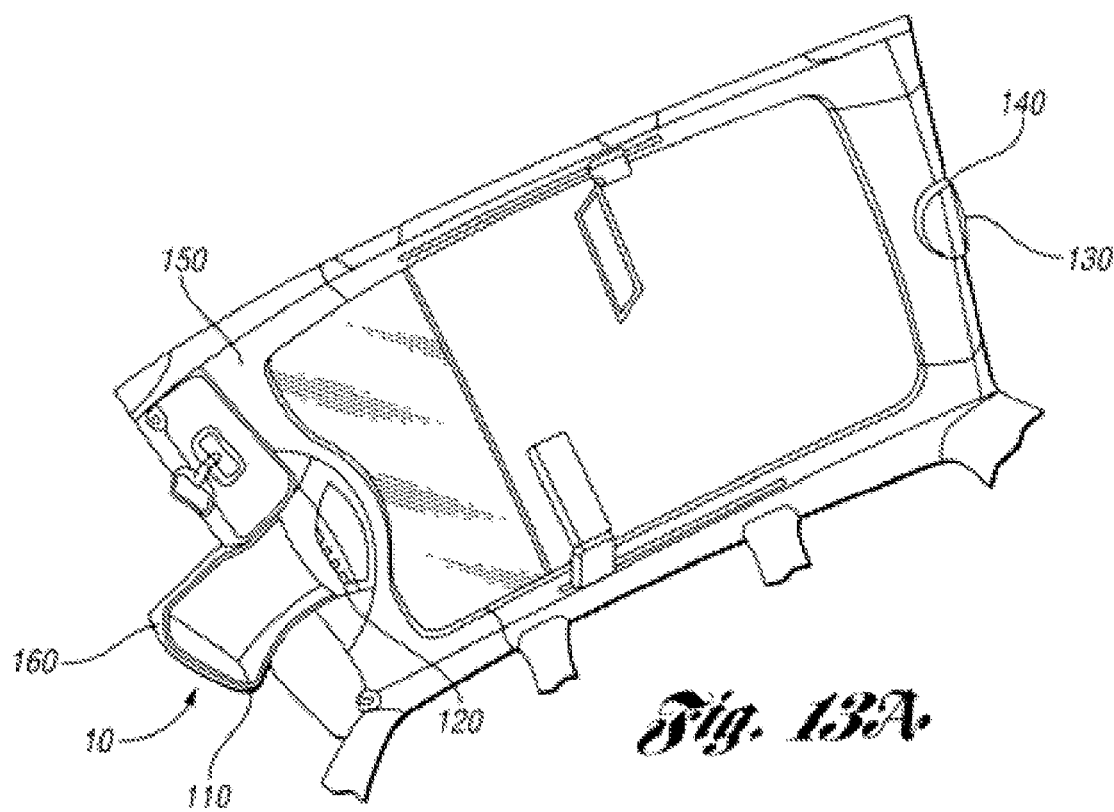
FIGS. 13A-B are perspective views of an overhead console with a vision system according to various exemplary embodiments.

In several exemplary embodiments, the vision system 10 is incorporated into the overhead console 150 without the use of a lens, e.g. as shown in FIGS. 13A-20. In FIG. 13A the display assembly 160 is mounted with respect to the vehicle parallel to the display source 120. The overhead console 150 includes a display source 120 which may be, for example, a video/projector screen. The screen portion 110 is mounted forward the display source 120. The system 10 is configured to display images received from camera 130 mounted in the CHMSL 140 as shown in FIG. 13A.

Figure 13B:
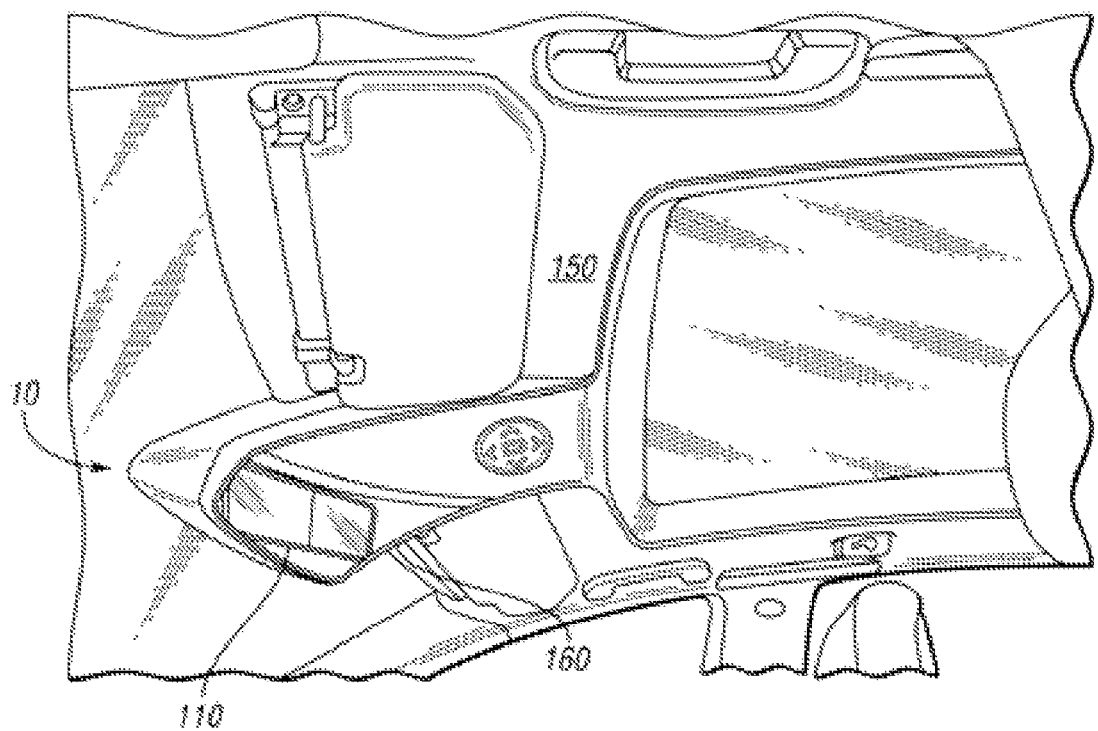

In the illustrated embodiment of FIG. 13B, a display source is not included in the display assembly 160. A screen portion 110 is included in the system 10 which is mounted in the overhead console 150. The screen portion is severable so that it may act as a reflective surface and display video images simultaneously.

Figure 14:
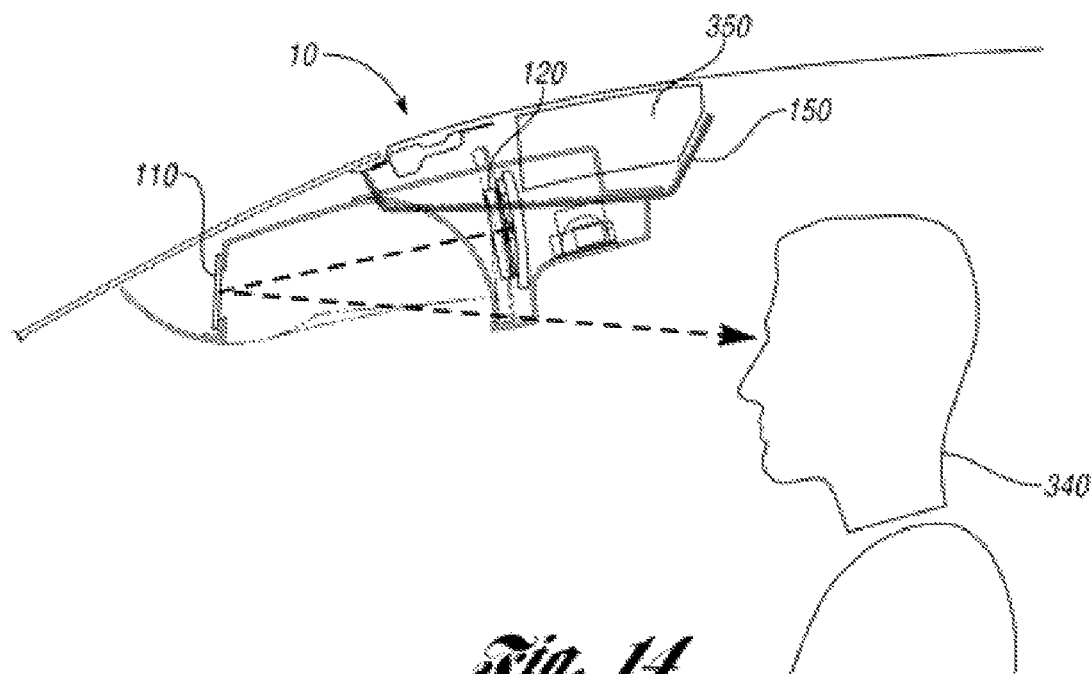
FIGS. 14-20 are side views of an overhead console with a vision system according to various exemplary embodiments.
Figure 15:
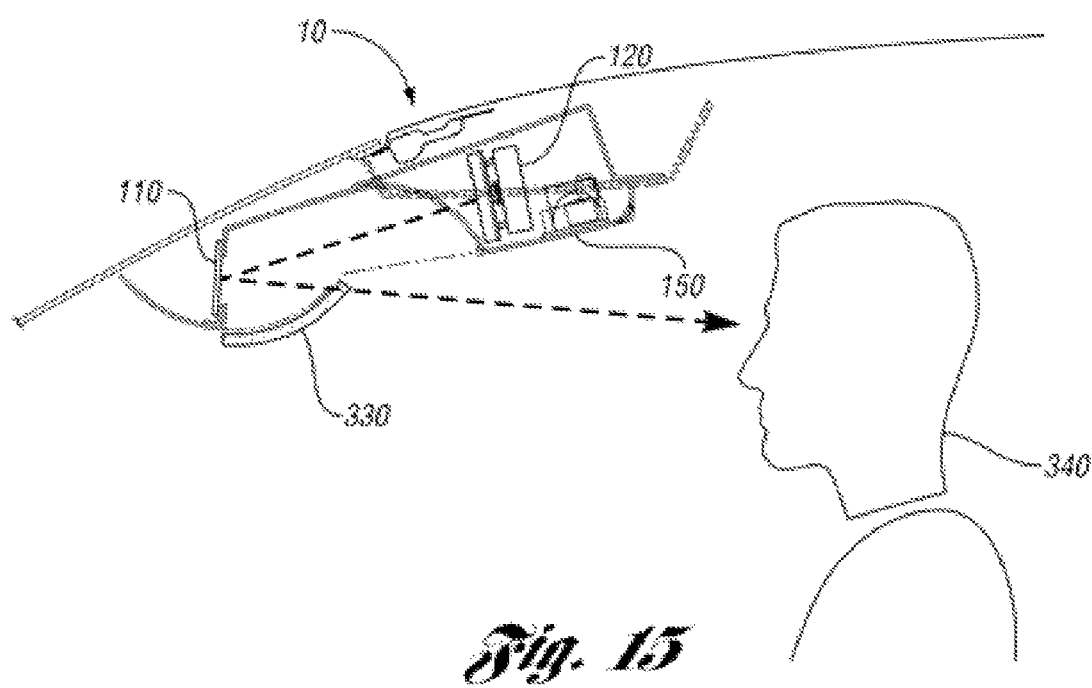
Figure 16:
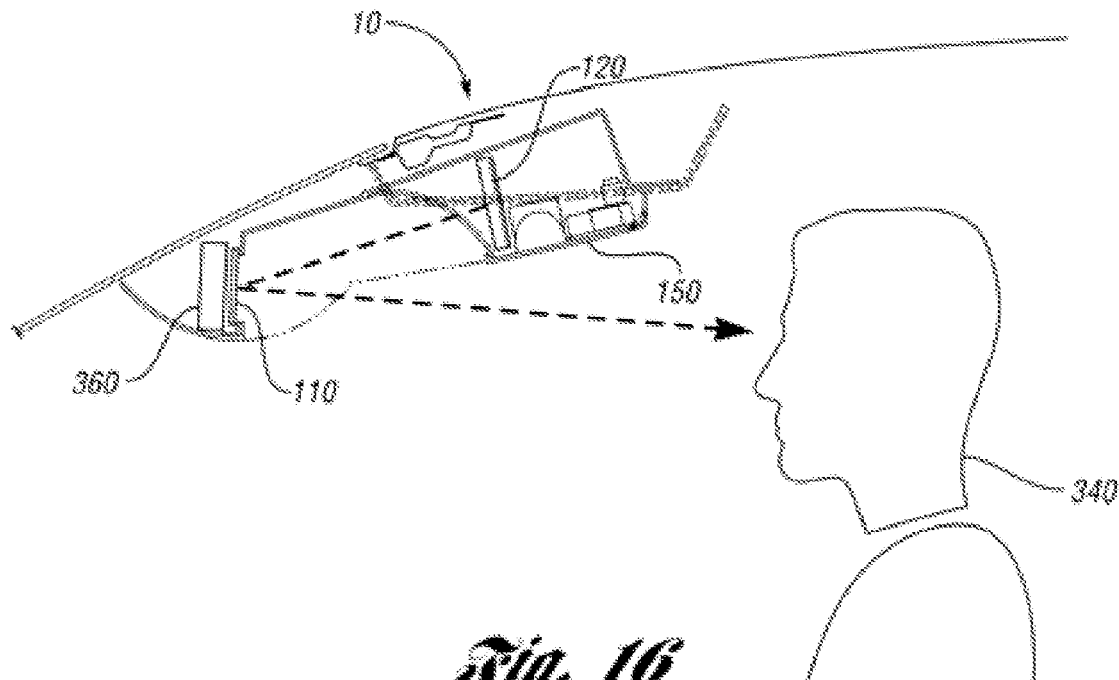

FIGS. 14-20 illustrate a side view of various exemplary embodiments of the vision system 10 incorporated into the overhead console 150. In FIG. 14, the overhead console 150 includes a sun roof motor 350 for automatically opening and closing a sun roof. The vision system 10 is packaged to accommodate the sun roof motor 350. The display source 120 is mounted forward the sun roof motor and is adjustable with respect to the overhead console 150. The screen portion 110 is flat, mounted forward the display source 120 and may be tilted according to preference. The overhead console 150 may not include an automatic sun roof (as shown in FIG. 16).

In FIG. 15, the overhead console 150 does not include an automatic sun roof. The display source 120 is coupled to the overhead console 150 and a screen portion 110 is mounted forward the display source 120. A lens 330 may be selectively coupled to the overhead console 150 to effectuate the far-field effect.

In FIG. 16, the overhead console 150 includes an adjustable screen portion 110 with fixed display source 120. The screen portion 110 is coupled to an adjuster mechanism 360 coupled to the vehicle overhead console 150. The adjuster mechanism 360 moves the screen portion 110 with respect to the overhead console. The adjuster mechanism 360 may include a motor-driven assembly or a manually operable adjuster. The screen portion 110 may be deformable (as discussed above) to change the curvature of the screen portion.

Figure 17:
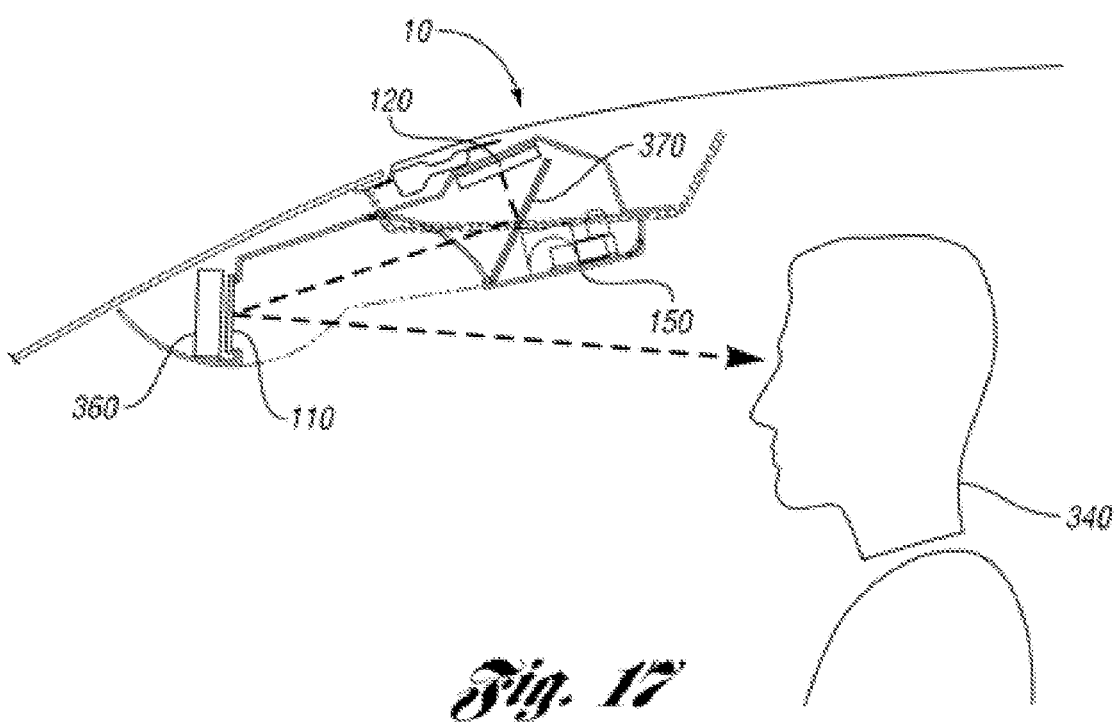
Figure 19:
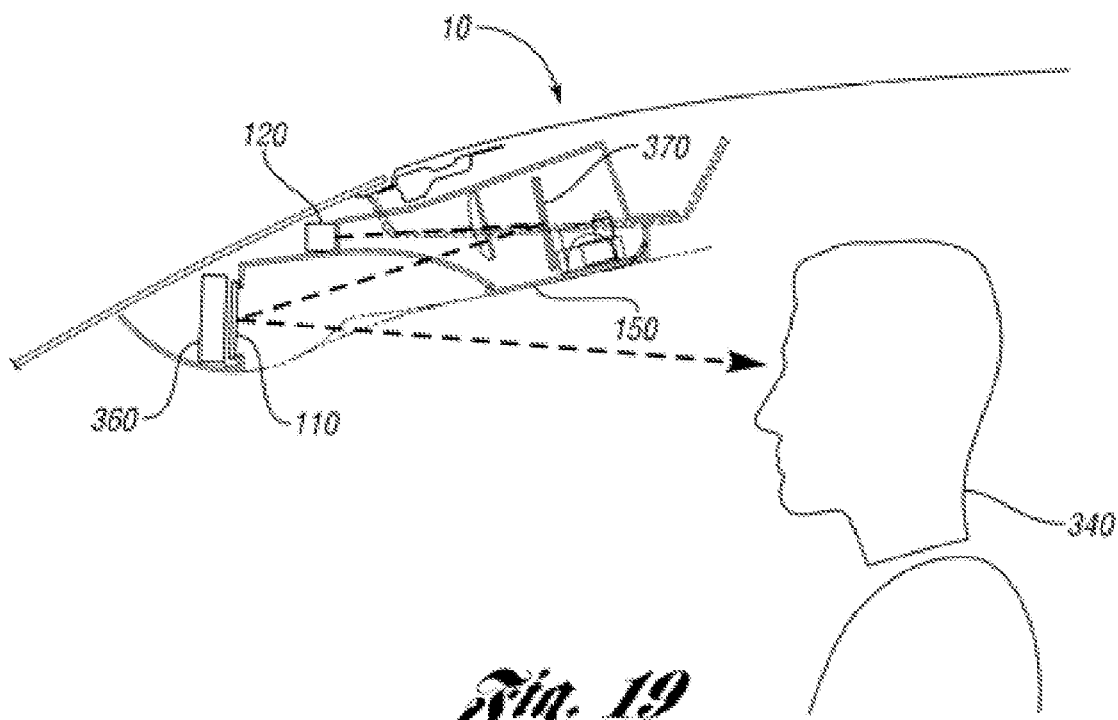

In FIG. 17, an intermediate screen portion 370 is included in the vision system 10. The intermediate screen portion 370 is placed between the display source 120 and screen portion 110. Video images are transmitted from the display source 120 to the intermediate screen portion 370 and reflected onto screen portion 110. The intermediate screen portion 370 is flat and reflective. In this arrangement, the image appears more distant with respect to the driver 340 as the video image travels farther with respect to the (reflective) intermediate screen portion 370. The display source 120 is a flat panel display. In another exemplary embodiment, the display source 120 is a projector configured to transmit a video image to the intermediate screen portion 370 (as illustrated in FIG. 19). An adjuster mechanism 360 is also included in the illustrated embodiment.

Figure 18:
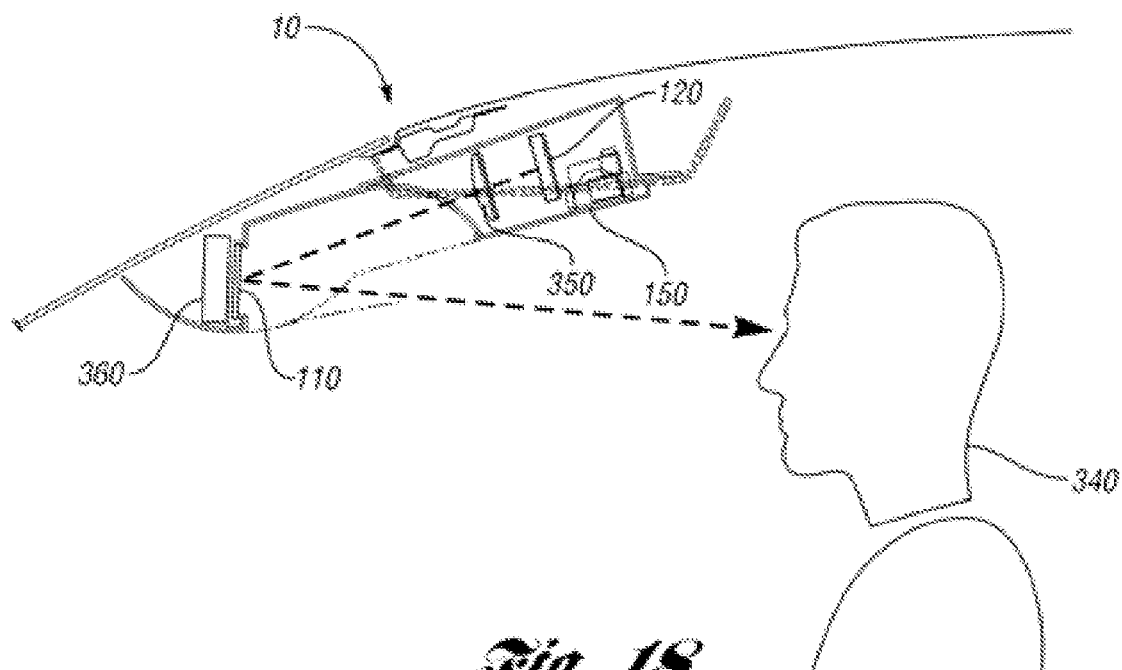

In FIGS. 18 and 19, lens 330 is placed between display source 120 and the screen portion 110. The lens 330 is a magnifying lens configured to enlarge the video image received from the display source 120. In this manner a smaller display source 120 may be utilized to achieve a standard or larger display on the screen portion. In FIG. 18, the lens 330 is placed rearward the display source 120 and in FIG. 19, the lens 330 is placed forward the display screen for a greater distance of travel. An intermediate screen portion 370 is included in the illustrated embodiment of FIG. 19.

Figure 20:
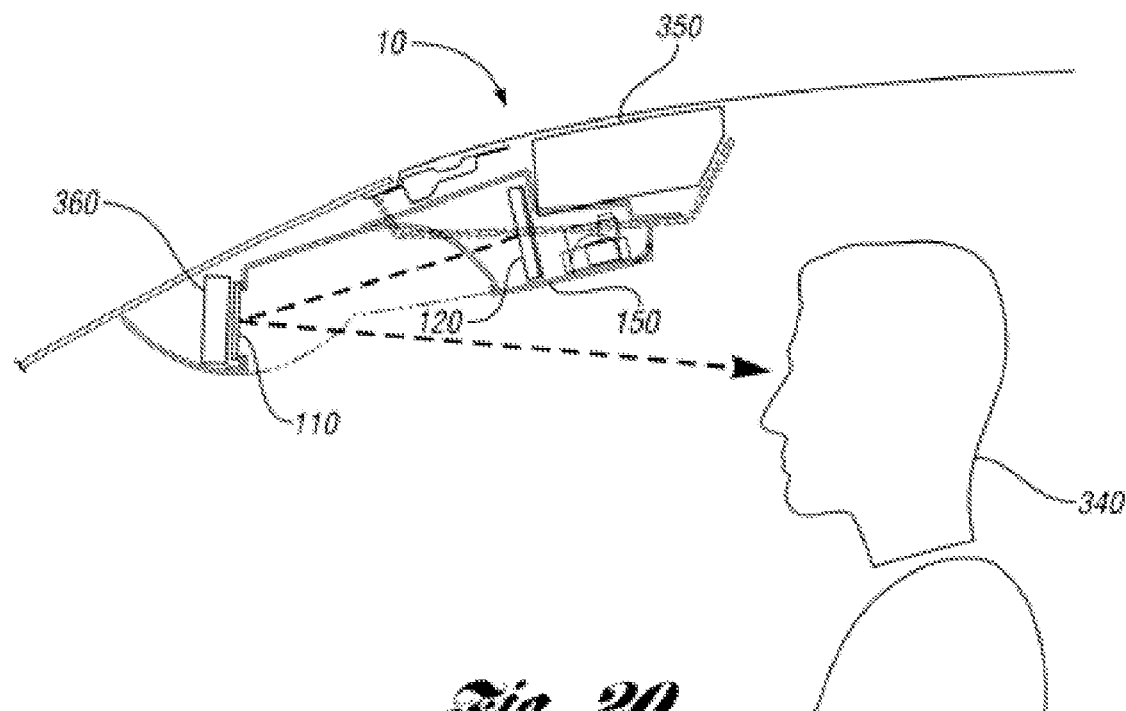

In another exemplary embodiment, the overhead console 150 includes a sun roof motor 350 for automatically opening and closing a sun roof (as shown in FIG. 20). The display source 120 is mounted forward the sun roof motor 350, with respect to the vehicle. The screen portion 110 is flat, mounted forward the display source 120 and is adjustable—via adjustment mechanism 360—with respect to the overhead console 150.

The display assembly 160 may be located in any one a plurality of locations within the vehicle cabin. For example, in one exemplary embodiment, the display assembly is mounted in the center stack console and is incorporated into the vehicle's GPS display system. In another embodiment, the display assembly 160 is incorporated into the vehicle door so as to display video images on the side window thus eliminating the need for a side view mirror. Additionally the display assembly may be located on the vehicle dashboard, instrument panel, overhead console or any other location internal or external to the vehicle cabin. In one embodiment, the display assembly yields a heads up display as it projects images on a transparent screen portion (e.g., the side window or windshield). The screen portion may selectively change transparency to operate in heads-up mode or in a different mode (e.g., reflective). Screen portion may also have various surface treatments so that images may be projected only onto a predetermined segment of the screen portion, i.e., the treated segment. For example, an ultraviolet solution may be applied to half of the screen portion so that only images projected via UV lighting may be viewed on the treated segment of the screen portion.

Figure 21:
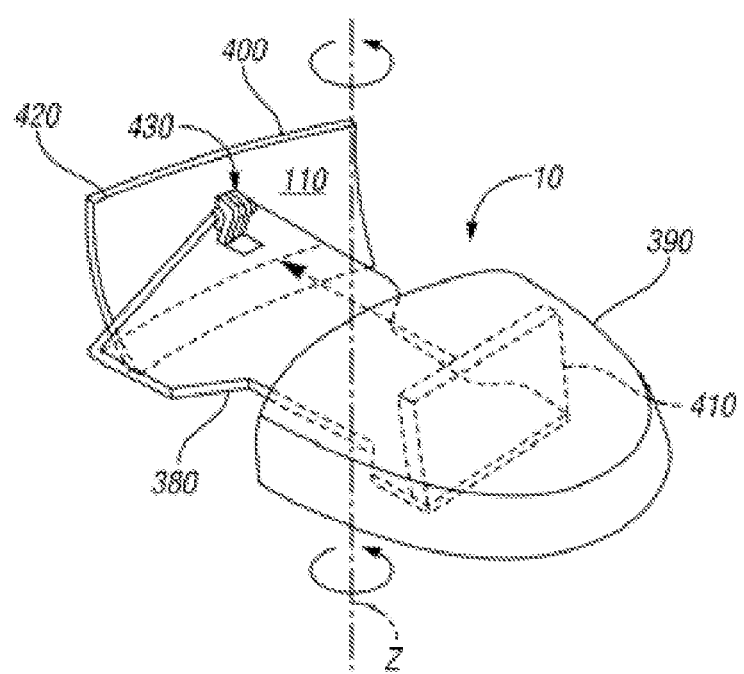
FIG. 21 is a perspective view of a bracket for a vision system according to an exemplary embodiment.

Referring now to FIG. 21, according to another exemplary embodiment, a bracket 380 is included in the vision system 10. The bracket 380 includes two distal ends 390 and 400. Distal end 390 includes a flange to which a reflective surface 410 is coupled. Distal end 400 also includes a flange 420 to which a pivot assembly 430 for the screen portion 110 is coupled. The screen portion 110 may be a concave screen portion. The bracket 380 is pivotable on pivot assembly 430 with respect to the Z-axis. Bracket 380 also maintains a perpendicular relationship between pivot assembly 430 of the screen portion 110 and the reflective surface 410. The screen portion 110 is optimally positioned to receive non-distorted video images from the reflective surface 410. The bracket 380 and display assembly 160 can be mounted within an overhead console or at any location with respect to the vehicle. Adjustment can be made around the Z-axis to accommodate the user's preferential settings. A control circuit can be coupled to motors to pivot the assembly 160 about the Z-axis. The vision system 10 may also be configured with a plurality of selectable pre-programmed configurations, e.g., for "his", "hers", "mom", "dad", and "teenaged son/daughter" position settings. In one exemplary embodiment, the bracket 380 is composed of a hard plastic and manufactured via injection molded.

A method of displaying an image to an operator of a motor vehicle at an adjusted focal length is included in another exemplary embodiment, which includes providing a display assembly configured to display an image. The image defines a focal length with respect to any location in the motor vehicle. The method further includes providing a lens configured to alter a perception of the focal length of the image with respect to the same location in the motor vehicle; and interposing the lens between the display assembly and the operator in a manner to effectuate a distorted focal length of the image.

It should also be noted that the vehicle vision systems and methods disclosed herein can be used in a variety of automobiles such as cars, trucks, SUVs, minivans, buses (and the like), airplanes, boats, etc. and other non-vehicle viewing applications. While the exemplary embodiments illustrated in the FIGs and described above are presently preferred, it should be understood that these embodiments are offered by way of example only. For example, the teachings herein can be applied to any vision system and are not limited to vision systems. Accordingly, the present vehicle vision system is not limited to a particular embodiment but extends to various modifications within the scope of the invention.

What is claimed is:

1. An overhead console for use in a motor vehicle at least partially housing a vision system having a camera mounted on the motor vehicle, comprising:
  a display source configured to receive video signals from the camera, wherein the display source is mounted within the overhead console;
  a first screen portion attached to the motor vehicle configured to display video images from the display source when the vision system is operating in a first mode;
  a second screen portion adjacent the first screen portion and a part of a same rear view mirror assembly as the first screen portion, the second screen portion comprising a mirror portion for reflecting images; and
  wherein the display source is configured to project video images onto the first screen portion, and wherein the first screen portion is configured to reflect the video images such that the video images appears to a person within the motor vehicle to be at a distance greater than the distance between the display source and the first screen portion, wherein the first screen portion is selectively deformable to alter a focal point of the reflected video images, wherein the motor vehicle automatically selectively deforms the first screen portion to alter the focal point of the reflected video images in response to a predetermined condition associated with the motor vehicle, and wherein the automatic deformation is caused to occur without direct manual deformation of the first screen portion.

2. The overhead console of claim 1, further comprising:
  a mounting bracket coupling the display source and the first screen portion so that the display source is parallel with respect to the first screen portion.

3. The overhead console of claim 1, wherein the second screen portion is deformable.

4. The overhead console of claim 1, wherein the first screen portion is selectively deformable from a substantially flat position to a substantially concave position.

5. The overhead console of claim 1, wherein the display source includes a receiver configured to wirelessly receive video signals from the camera.

6. The overhead console of claim 1, wherein the predetermined condition is a retraction of a headrest.

7. The overhead console of claim 1 further comprising:
   an intermediate screen portion, wherein the intermediate screen portion reflects the projected video images of the display source toward the first screen portion.

* * * * *